US007134507B2

(12) United States Patent
Heskestad

(10) Patent No.: US 7,134,507 B2
(45) Date of Patent: Nov. 14, 2006

(54) METHOD AND APPARATUS FOR DETECTING A SPRINKLER ACTUATION EVENT

(75) Inventor: Gunnar Heskestad, Dover, MA (US)

(73) Assignee: FM Global Technologies, LLC, Johnston, RI (US)

( * ) Notice: Subject to any disclaimer, the term of this patent is extended or adjusted under 35 U.S.C. 154(b) by 191 days.

(21) Appl. No.: 10/986,897

(22) Filed: Nov. 15, 2004

(65) Prior Publication Data

US 2006/0102735 A1 May 18, 2006

(51) Int. Cl.
*A62C 2/00* (2006.01)
*A62C 35/00* (2006.01)
*A01G 27/00* (2006.01)
*A01G 25/00* (2006.01)

(52) U.S. Cl. .............................. 169/43; 169/8; 169/16; 239/67; 239/68; 239/69; 239/201; 239/203; 239/204

(58) Field of Classification Search .................. 169/43, 169/5, 8, 16, 17, 37; 239/67–69, 71, 569, 239/200, 201, 203, 204, DIG. 15
See application file for complete search history.

(56) References Cited

U.S. PATENT DOCUMENTS 3,797,740 A * 3/1974 Kah, Jr. ........................ 239/11
4,051,467 A 9/1977 Galvin
4,592,747 A 6/1986 Pool
4,694,161 A 9/1987 Sackett
4,945,344 A 7/1990 Farrell et al.
5,717,146 A * 2/1998 Ortiz ........................ 73/861.42
5,905,208 A 5/1999 Ortiz et al.
5,932,814 A 8/1999 Hutchinson
5,979,565 A * 11/1999 Wicks et al. .................. 169/17
6,202,683 B1 * 3/2001 Smith .......................... 137/498
6,239,446 B1 5/2001 Cholin
6,568,416 B1 5/2003 Tucker et al.

* cited by examiner

*Primary Examiner*—Davis Hwu
(74) *Attorney, Agent, or Firm*—Merek, Blackmon & Voorhees, LLC

(57) ABSTRACT

A method of detecting the actuation of a sprinkler involves sensing a first fluid pressure at a first flow cross section, in one of the sprinkler and a conduit in which the sprinkler is mounted, sensing a second fluid pressure at a second flow cross section, in the sprinkler, wherein said first flow cross section is larger than said second flow cross section, and comparing the fluid pressures sensed at the first and second flow cross sections in order to detect a change in the relation of the fluid pressures due to actuation of the sprinkler, and thereby detect actuation of the sprinkler. The fluid pressures are sensed by ports in the sprinkler, or by one port in the sprinkler and one port in the conduit, and at least one transducer connected to the ports, and output signals from the transducer are sent to a computer or other recording instrument.

24 Claims, 3 Drawing Sheets

METHOD AND APPARATUS FOR DETECTING A SPRINKLER ACTUATION EVENT

BACKGROUND OF THE INVENTION

The present invention relates to the detection of the actuation of a fire sprinkler, for example, in tests related to research in controlling fires or in actual fire sprinkler installations.

In fire tests for evaluating the effectiveness of a fire sprinkler or arrangement of fire sprinklers, it is helpful to know the precise time of actuation of the sprinkler or sprinklers. The present art in detecting the operation of a fire sprinkler, as in fire testing, is based on the sprinkler being part of an electrical circuit that is interrupted the instant that the heat responsive element of the sprinkler actuates upon exposure to a fire. In one type, electrical wires extend to a heat fusible link that melts in response to the heat of a fire and allows water to flow. The link and wires are part of an electric circuit that is broken when the link melts, whereby the operation of the sprinkler can be detected. In electric sprinkler actuation detection devices generally, the electrical connections at the sprinkler may interfere, or be perceived to interfere, with the actuation event itself or with the water spray produced by the sprinkler. The interference with the water spray can be either in the region of the so-called deflector that generates the drops or in the spray formation region below the deflector.

SUMMARY OF THE INVENTION

The system of detecting sprinkler actuation according to the present invention does not in any way interfere with the actuation event, the water flow or the spray formation. The sprinkler actuation detection system according to the present invention has no connections or other structure at the sprinkler, either in the region of the deflector that generates the drops or in the spray formation region below the deflector. It has no structure that interferes, or is likely to be perceived to interfere, with the actuation event itself or with the water spray produced by the sprinkler. Instead, the sensing of the first and second fluid pressures is performed solely with structure entirely outside the space required for actuation of the sprinkler and the space occupied by fluid issuing from the sprinkler outlet.

In order to detect sprinkler actuation, the method and apparatus according to the present invention use the pressure difference between a high pressure port in fluid communication with a region of larger flow cross section and a low pressure port in fluid communication with a region of smaller flow cross section, wherein both regions are in a path taken by fluid flowing through the sprinkler when the sprinkler is actuated. Before actuation of the sprinkler, the fluid pressures at the high pressure port and the low pressure port are substantially the same as one another. However, after actuation, the fluid pressure at the high pressure port is higher than the fluid pressure at the low pressure port, and this change in the relationship of the two pressures from before actuation to after actuation is detected in accordance with the present invention.

The method and apparatus according to the present invention are insensitive to pressure transients caused by the operation of other sprinklers, because the high pressure and low pressure ports are sufficiently close to one another that they are affected by pressure changes at the same time or virtually the same time. As a result, there are no false indications of sprinkler actuation from a transient increase in fluid pressure reaching one port before the other and causing a temporary difference in fluid pressure at the two ports.

DETAILED DESCRIPTION OF THE PREFERRED EMBODIMENTS

Figure 1:
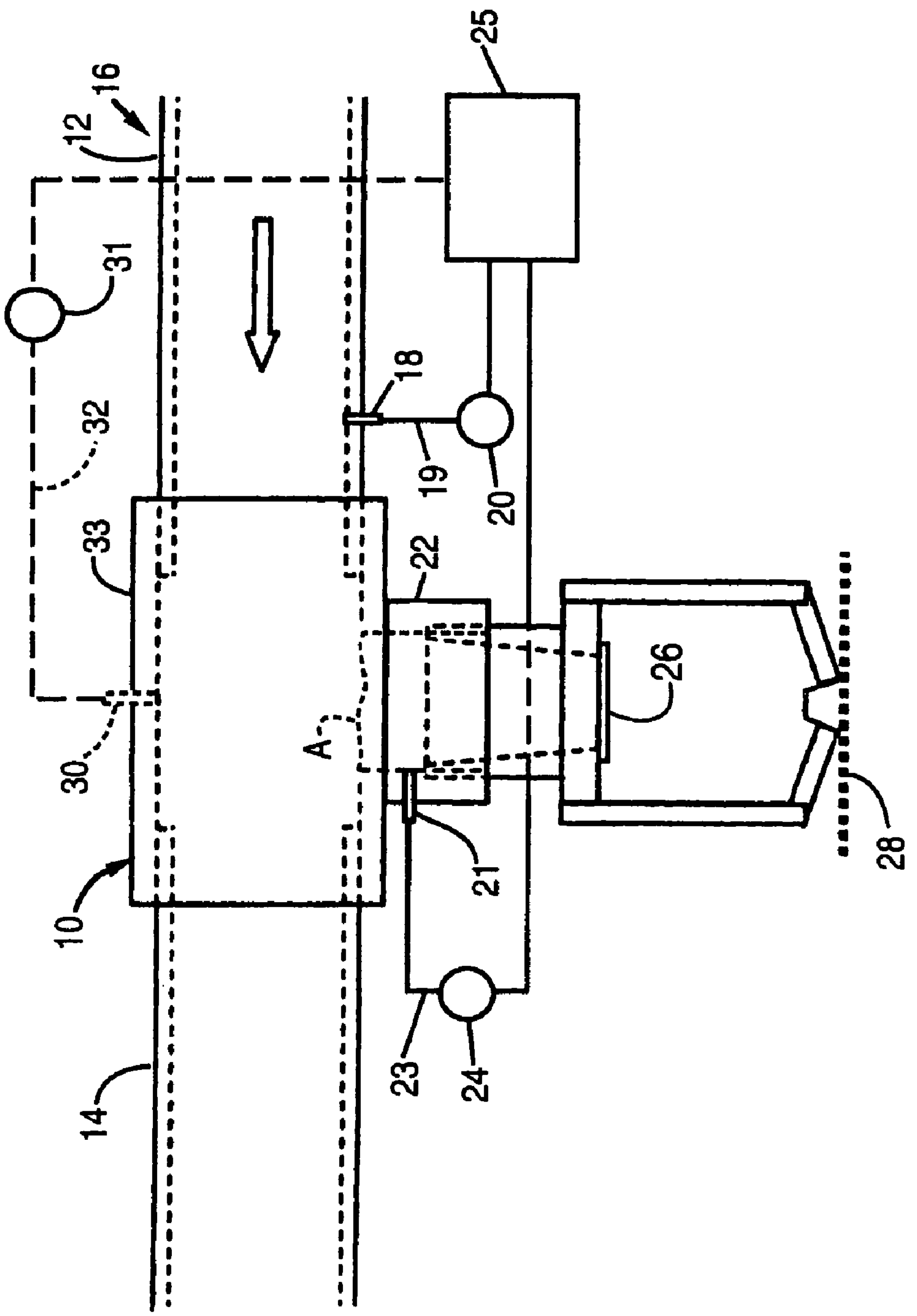
FIG. 1 is a schematic front elevation of a first embodiment of a fire sprinkler actuation detection system according to the present invention before actuation of the fire sprinkler.

As can be seen from FIG. 1, a sprinkler fitting, or sprinkler, according to the present invention, which is designated generally by the reference numeral 10, is positioned between inlet and outlet pipe sections 12 and 14, respectively, of a pipe 16 that carries a fluid extinguishant, such as water, for fire testing purposes or for fire protection of a space containing people and/or material. The pipe 16 may carry stagnant water or water flowing to open sprinklers at other sprinkler sites.

A high pressure port 18 is provided in the wall of the inlet pipe section 12 upstream of the sprinkler 10, so that the fluid in the pipe 16 can be accessed at that point, and the pressure of the fluid can be sensed by an appropriate instrument. For example, the high pressure port 18 can be connected by a fluid conduit 19 to a pressure transducer 20 that can sense the pressure at the port and provide an electrical signal whose strength is proportional to the pressure sensed. The high pressure port 18, the fluid conduit 19 and the pressure transducer 20 comprise a first pressure sensing arrangement.

A low pressure port 21 is provided in a wall of the sprinkler 10, in a side branch 22 that has a smaller flow cross section than the inlet pipe section 12, so that the fluid pressure in the sprinkler can be accessed at that point. The low pressure port 21 can be connected by a fluid conduit 23 to a pressure transducer 24. The low pressure port 21, the fluid conduit 23 and the pressure transducer 24 comprise a second pressure sensing arrangement.

The pressure transducers 20 and 24 are connected by, for example, wires to a computer 25 or other recording instrument. In the embodiment illustrated in FIGS. 1 and 2, the computer 25 also functions as a comparator that can receive and compare signals from a plurality of transducers and can detect changes in the relationship of the signals and, therefore, can detect changes in the relationship of the pressures sensed by the transducers. In addition to comparing the relationship of sensed pressures, the computer 25 can also include the ability to perform other functions, such as indicating the magnitude of the fluid pressures sensed by the transducers 20 and 24 and the difference in the pressures.

The ports 18 and 21, the transducers 20 and 24, the fluid lines 19 and 23 connecting the ports to the transducers, the wires connecting the transducers to the computer 25, and the computer itself are positioned above the outlet of the sprinkler 10 that directs the fluid to the space around the sprinkler. In fact, all of the structure used for sensing and comparing the fluid pressures is entirely outside the space required for actuation of the sprinkler and the space that will be occupied by fluid issuing from the sprinkler outlet when the sprinkler actuates. As a result, the present invention avoids interference with, and the perception of interference with, the actuation event itself and the fluid spray produced by the sprinkler.

The pipe 16 may contain stagnant water or water flowing to open sprinklers at other sprinkler sites. With stagnant water, the fluid pressures at the high pressure port 18 and the low pressure port 21 are the same, except for minute differences due to hydraulic heads associated with differences in elevation. Even with flowing water, which is separated, at an interface designated in FIG. 1 by the dashed line A, from nearly stagnant water in the side branch 22, or side outlet, leading to the sprinkler outlet, the pressures at the high pressure port 18 and the low pressure port 21 are practically the same.

Figure 2:
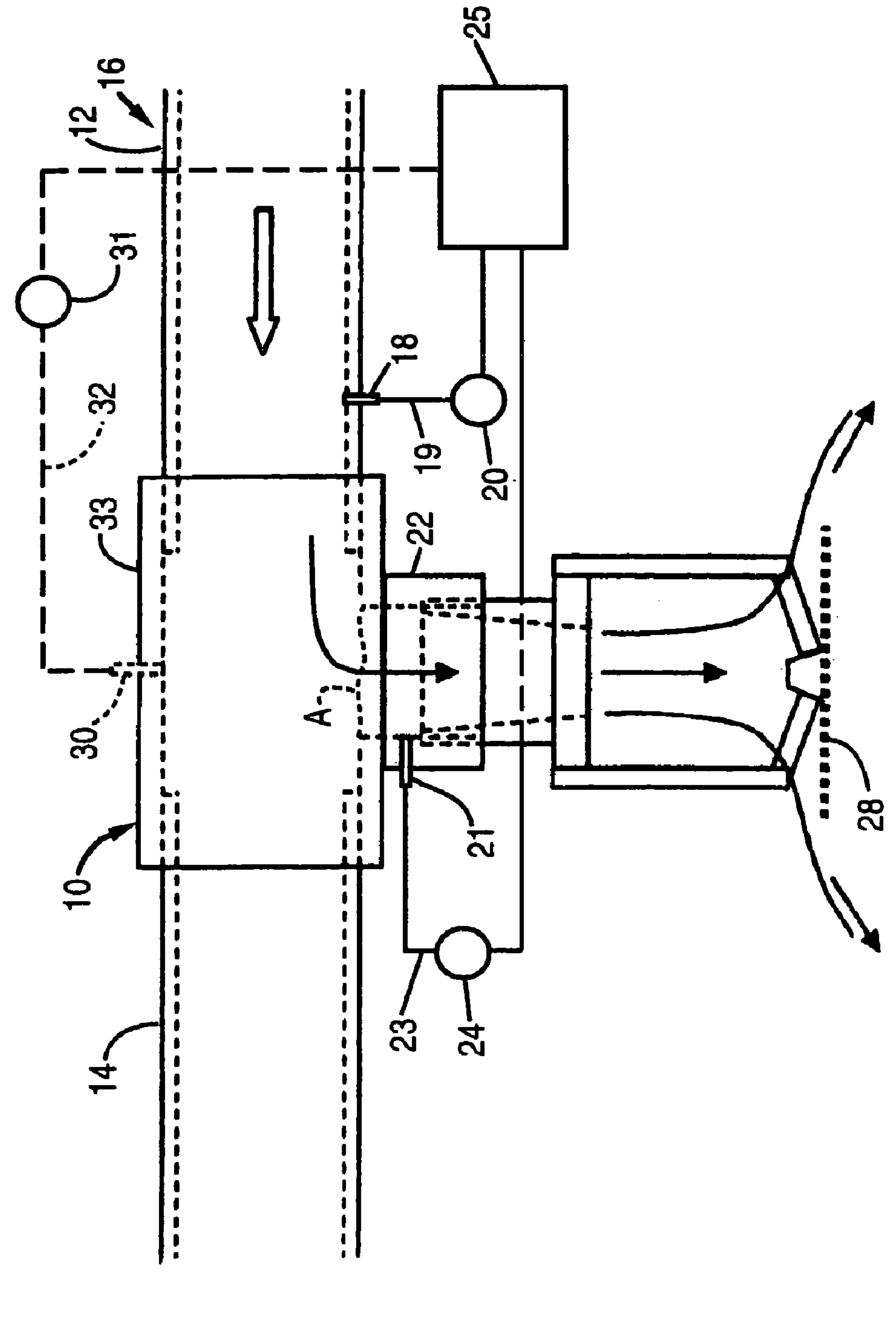
FIG. 2 is a schematic front elevation of the fire sprinkler actuation detection system of FIG. 1 after actuation of the fire sprinkler.

FIG. 2 represents the condition in which the sprinkler of FIG. 1 has actuated. A valve cover 26 shown in FIG. 1 has separated from the sprinkler 10 in FIG. 2 by, for example, operation of a heat-responsive element of the sprinkler. As a result, water is flowing from the pipe 16 through the side branch 22 to the sprinkler, generating a spray at a deflector 28. The flow develops a pressure drop between the high pressure port 18 and the low pressure port 21, whether or not there is a pre-existing flow in the pipe 16. The pressure drop, which is detected by the computer 25 in cooperation with the pressure transducers 20 and 24, can be used to record the sprinkler actuation event, for example, the time of the actuation event. Because of the proximity of the high pressure and low pressure ports 18 and 21, pressure waves that may be traveling up and down the pipe 16 from operation of other sprinklers affect both ports at the same time or virtually the same time and, therefore, have insignificant effect on the pressure differential detected by the comparator 25.

In the embodiment of FIGS. 1 and 2, instead of positioning a high pressure port in the pipe 16, as is the case with the port 18, a high pressure port 30 can be provided in the sprinkler 10. The high pressure port 30 is connected to a transducer 31 by a conduit 32. Any accessible peripheral location in the wall of a pipe portion 33 of the sprinkler 10 can be selected, as long as it opens into the flowing water side of the interface A.

Figure 3:
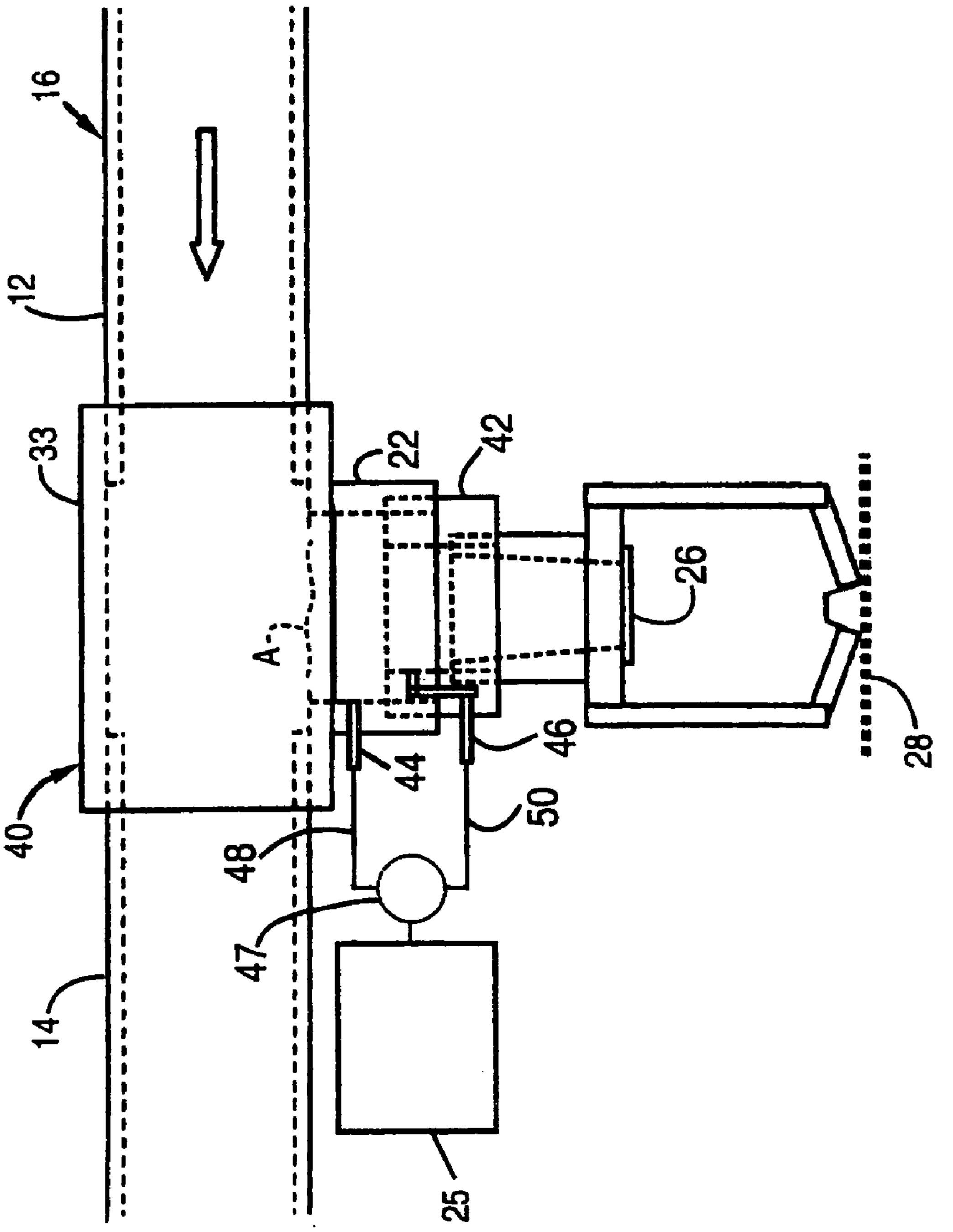
FIG. 3 is a schematic front elevation of a second embodiment of a fire sprinkler actuation detection system according to the present invention.

As can be seen from FIG. 3, in an alternate embodiment of the present invention, a sprinkler 40 includes a bushing 42 that connects the sprinkler outlet and the deflector 28 to the rest of the side branch 22. A high pressure port 44 can be provided in a full cross section of the side branch 22, and a low pressure port 46 can be provided in the bushing 42. The bushing 42 fits into the side branch 22 and has a smaller inside cross sectional area than the full inside cross section of the side branch. The high pressure port 44 is connected to one side of a differential pressure transducer 47 by a conduit 48, and the low pressure port 46 is connected to the opposite side of the differential pressure transducer 47 by a conduit 50. The differential pressure transducer 47 functions as a comparator, sensing the difference in the pressures on its opposite sides and outputting a signal representative of the difference. Because the flow cross section decreases between the high pressure and low pressure ports 44 and 46, a pressure differential is developed the instant the sprinkler activates, the pressure differential being detected by the differential pressure transducer 47. The output signal of the differential pressure transducer 47 can be sent to a computer 25 for recording and other purposes by, for example, a cable. Of course, a recording instrument other than the computer 25 can be used.

It will be apparent to those skilled in the art, and it is contemplated, that variations and/or changes in the embodiments illustrated and described herein may be made without departure from the present invention. For example, the differential pressure transducer 47 of the embodiment of FIG. 3 can be used with the embodiment of FIGS. 1 and 2 in place of the transducers 20 and 24. Similarly, the pressure transducers 20 and 24 of the embodiment of FIGS. 1 and 2 can be used with the embodiment of FIG. 3 in place of the differential pressure transducer 47. Accordingly, it is intended that the foregoing description is illustrative only, not limiting, and that the true spirit and scope of the present invention will be determined by the appended claims.

The invention claimed is:

1. A method of detecting the actuation of a sprinkler connected to a conduit, wherein the sprinkler has an outlet for directing the flow of a fluid to a space outside the sprinkler and outside the conduit, there is no fluid flow through the sprinkler outlet before actuation, and there is fluid flow through the sprinkler outlet after actuation, comprising:

sensing a first fluid pressure at a first flow cross section, in one of the conduit and the sprinkler, of a path taken by fluid flowing through the sprinkler when the sprinkler is actuated, sensing a second fluid pressure at a second flow cross section, in the sprinkler, of a path taken by fluid flowing through the sprinkler when the sprinkler is actuated, wherein said first flow cross section is larger than said second flow cross section; and comparing the fluid pressures sensed at said first and second flow cross sections in order to detect a change in the relation of the fluid pressures due to actuation of the sprinkler, and thereby detect actuation of the sprinkler.

2. The method according to claim 1, wherein the sensing of the first and second fluid pressures is performed solely with structure entirely outside the space required for actuation of the sprinkler and the space occupied by fluid issuing from the sprinkler outlet.

3. The method according to claim 2, wherein the sensing of the first and second fluid pressures is performed with fluid ports opening, respectively, into said first and second flow cross sections.

4. The method according to claim 1, wherein the first and second flow cross sections are selected to be sufficiently close to one another that pressure changes that occur in the conduit and the sprinkler occur at both the first and second flow cross sections at substantially the same time, whereby the method according to the present invention is unaffected by pressure transients in the conduit and the sprinkler.

5. The method according to claim 1, wherein the first fluid pressure is sensed at a first flow cross section in the conduit.

6. The method according to claim 1, wherein the first fluid pressure is sensed at a first flow cross section in the sprinkler.

7. Apparatus for detecting the actuation of a sprinkler connected to a conduit, wherein the sprinkler has an outlet for directing the flow of a fluid to a space outside the sprinkler and outside the conduit, there is no fluid flow through the sprinkler outlet before actuation, and there is fluid flow through the sprinkler outlet after actuation, comprising:

a first pressure sensing arrangement in communication with a first flow cross section, in one of the conduit and the sprinkler, of a path taken by fluid flowing through the sprinkler when the sprinkler is actuated, in order to sense a first fluid pressure at said first flow cross section; and a second pressure sensing arrangement in communication with a second flow cross section, in the sprinkler, of a path taken by fluid flowing through the sprinkler when the sprinkler is actuated, in order to sense a second fluid pressure at said second flow cross section, whereby outputs from said first and second pressure sensing arrangements representing the fluid pressures at, respectively, said first and second flow cross sections can be compared to detect a change in the relation of the fluid pressures at said first and second flow cross sections due to actuation of the sprinkler, and thereby detect actuation of the sprinkler.

8. The apparatus according to claim 7, further comprising a comparator receiving from said first and second pressure sensing arrangements outputs representing the fluid pressures at, respectively, said first and second flow cross sections and detecting a change in the relation of the fluid pressures at said first and second flow cross sections due to actuation of the sprinkler.

9. The apparatus according to claim 8, wherein the apparatus is entirely outside the space required for actuation of the sprinkler and the space occupied by fluid issuing from the sprinkler outlet.

10. The apparatus according to claim 7, wherein said first pressure sensing arrangement comprises a first port opening into one of said conduit and said sprinkler, a pressure transducer and a fluid line connecting said first port to said pressure transducer.

11. The apparatus according to claim 10, wherein said second pressure sensing arrangement comprises a second port opening into said sprinkler, a pressure transducer and a fluid line connecting said second port to the pressure transducer of said second pressure sensing arrangement.

12. The apparatus according to claim 11, wherein the first and second ports are sufficiently close to one another that pressure changes that occur in the pipe and the conduit occur at both the first and second ports at substantially the same time, whereby the apparatus according to the present invention is unaffected by pressure transients in the conduit and the sprinkler.

13. The apparatus according to claim 11, wherein the pressure transducer of the second pressure sensing arrangement is the pressure transducer of the first pressure sensing arrangement, the pressure transducer being a differential pressure transducer.

14. The apparatus according to claim 10, wherein said first port opens into said conduit.

15. The apparatus according to claim 10, wherein said first port opens into said sprinkler.

16. Apparatus for detecting the actuation of a sprinkler connected to a conduit, wherein the sprinkler has an outlet for directing the flow of a fluid to a space outside the sprinkler and outside the conduit, there is no fluid flow through the sprinkler outlet before actuation, and there is fluid flow through the sprinkler outlet after actuation, comprising:

a first pressure sensing arrangement in communication with a high pressure region, in one of the conduit and the sprinkler, of a path taken by fluid flowing through the sprinkler when the sprinkler is actuated, in order to sense a first fluid pressure in said high pressure region; and a second pressure sensing arrangement in communication with a low pressure region, in the sprinkler, of a path taken by fluid flowing through the sprinkler when the sprinkler is actuated, in order to sense a second fluid pressure in said low pressure region, wherein the high pressure region has a higher fluid pressure than the low pressure region when the sprinkler is actuated, whereby outputs from said first and second pressure sensing arrangements representing the fluid pressures in, respectively, said high and low pressure regions can be compared to detect a change in the relation of the fluid pressures in said high and low pressure regions due to actuation of the sprinkler, and thereby detect actuation of the sprinkler.

17. The apparatus according to claim 16, further comprising a comparator receiving from said first and second pressure sensing arrangements outputs representing the fluid pressures in, respectively, said high and low pressure regions and detecting a change in the relation of the fluid pressures in said high and low pressure regions due to actuation of the sprinkler.

18. The apparatus according to claim 17, wherein the apparatus is entirely outside the space required for actuation of the sprinkler and the space occupied by fluid issuing from the sprinkler outlet.

19. The apparatus according to claim 16, wherein said first pressure sensing arrangement comprises a first port opening into one of said conduit and said sprinkler, a pressure transducer and a fluid line connecting said first port to said pressure transducer.

20. The apparatus according to claim 19, wherein said second pressure sensing arrangement comprises a second port opening into said sprinkler, a pressure transducer and a fluid line connecting said second port to said pressure transducer.

21. The apparatus according to claim 20, wherein the first and second ports are sufficiently close to one another that pressure changes that occur in the pipe and the conduit occur at both the first and second ports at substantially the same time, whereby the apparatus according to the present invention is unaffected by pressure transients in the conduit and the sprinkler.

22. The apparatus according to claim 20, wherein the pressure transducer of the second pressure sensing arrangement is the pressure transducer of the first pressure sensing arrangement, the pressure transducer being a differential pressure transducer.

23. The apparatus according to claim 19, wherein said first port opens into said conduit.

24. The apparatus according to claim 19, wherein said first port opens into said sprinkler.

* * * * *